(12) United States Patent
Murase et al.

(10) Patent No.: US 6,186,764 B1
(45) Date of Patent: Feb. 13, 2001

(54) INJECTION MOLDING MACHINE

(75) Inventors: Katsumi Murase; Taiki Watanabe, both of Ohbu; Shozo Honda, Toyama-ken, all of (JP)

(73) Assignees: Kabushiki Kaisha Meiki Seisakusho, Aichi-ken; Sanko Gosei Ltd., Toyama-ken, both of (JP)

( * ) Notice: Under 35 U.S.C. 154(b), the term of this patent shall be extended for 0 days.

(21) Appl. No.: 09/208,308

(22) Filed: Dec. 11, 1998

(30) Foreign Application Priority Data

Dec. 17, 1997 (JP) ...................................... 9-347809

(51) Int. Cl.[7] ..................................... B29C 45/24
(52) U.S. Cl. ....................... 425/226; 264/39; 264/328.11
(58) Field of Search ................................... 425/226, 547, 425/574; 264/39, 328.11

(56) References Cited

U.S. PATENT DOCUMENTS 6,015,281 * 1/2000 Chikazawa et al. ................. 425/226

FOREIGN PATENT DOCUMENTS

| 47-5696 | 3/1972 | (JP) . |
| 49-2976 | 1/1974 | (JP) . |
| 49-146259 | 12/1974 | (JP) . |
| 59-7026 | 1/1984 | (JP) . |
| 3-64724 | 6/1991 | (JP) . |
| 4-107015 | 4/1992 | (JP) . |

* cited by examiner

Primary Examiner—Tim Heitbrink
(74) Attorney, Agent, or Firm—Oliff & Berridge, PLC

(57) ABSTRACT

The injection molding machine comprises the closing mechanism 5 having the nozzle touch member 3 to close the tip opening 1a of the nozzle 1 and the electric heater 6 to regulate the temperature of the nozzle touch member 3. The closing member 5 is constituted in such a manner as the arm 13 is pivotally supported on the jacket cover 11 mounted on the nozzle 1, the cylinder 7 is mounted on mounting member 14 provided at the tip of the arm 13, and the nozzle touch member 3 is supported at the tip of the piston rod 7a. The electric heater 6 is arranged around the nozzle touch member 3. When the arm 13 is rotated from the retreated position R to the closed position C by the actuation of the rotor 8, the nozzle touch member 3 is faced to the tip opening 1a of the nozzle 1, and by extending the cylinder 7, the nozzle touch member 3 regulated to the temperature suitable for the resin material by the electric heater 6 closes the tip opening 1a from its front surface.

1 Claim, 4 Drawing Sheets

INJECTION MOLDING MACHINE

BACKGROUND OF THE INVENTION

1. Field of Invention

The present invention relates to an injection molding machine. In particular, the present invention is directed to an injection molding machine providing a nozzle touch member provided to open and close a tip opening of a heating cylinder so that a plasticizing-measuring process can be conducted without touching a nozzle on a sprue of a mold or laying it open.

2. Description of Related Art

In general, a single molding cycle process in an injection molding machine includes a plasticizing-measuring process. In the plasticizing-measuring process, resin material is reserved in a front portion of a heating cylinder while the resin material in the heating cylinder is kneaded and melted/plasticized by a screw that rotates, for example, on an axis of the heating cylinder. The resin material is reserved and measured in the front portion of the heating cylinder as the screw generates back pressure while it retreats in an axial direction to a given position. Next, the screw moves forward in the axial direction from the retreated position so that molten/plasticized and measured resin material is injected into a cavity of a mold from a nozzle provided in a tip of a heating cylinder.

The temperature at which the resin materials are melted/plasticized in the plasticizing-measuring process is dependent on the type of resin material being used, and the particular molding conditions, including but not limited to, the melting/plasticizing temperature, the configuration of the molded product and the temperature of the mold.

In the above-mentioned process, "drooling" can occur wherein resin material that is melted/plasticized and reserved in the front portion of the heating cylinder leaks from the tip of the nozzle. If drooling occurs, various problems may result, including but not limited to, a shortage of molten resin material, contamination of surroundings due to dripping molten resin material, and excessive consumption of resin material. In addition, the tip of the nozzle may cool, causing the fluidity of the molten-plasticized resin material to diminish, thereby adversely affecting injection, and causing the molded product to become uneven, or the like.

In order to prevent drooling, the plasticizing-measuring process is typically performed so that the nozzle at the tip of the heating cylinder abuts against the sprue of the mold (hereinafter, referred to as "nozzle touch") or the nozzle is closed by being retreated and separated from the mold.

When carrying out the plasticizing-measuring process in the nozzle touch state, the nozzle is closed by maintaining nozzle touch without separating the nozzle from the solidified resin material in the sprue that is injected in the preceding molding cycle.

On the other hand, conventional examples of closing the nozzle by retreating and separating the nozzle from the mold, are disclosed in Japanese patent publication No. Sho 49-2976, Japanese patent laid-open publication Nos. Sho 47-5690, Sho 59-7026, Utility Model laid-open publication Nos. Sho 49-146259, Hei 49-107015 and the like.

For instance, JP patent publication No. Sho 49-2976 discloses an automatic covering apparatus in which a ring holding frame member is fixed around an outer circumference of a heating cylinder. On a side of the ring holding frame member, an operation lever is pivotably provided through a first pivot pin. In a recessed portion of the operation lever, a nozzle cover is slidably supported through a second pivot pin and a driving mechanism for rotating the nozzle cover and the operation lever is provided.

In this embodiment, at an almost central portion of the nozzle cover, a recessed portion is configured so that its shape corresponds approximately to the shape of the tip of the nozzle. In addition, on a flange portion formed on the ring holding frame member, a regulating bolt is provided. The regulating bolt is adjusted so that the shape of the recessed portion of the nozzle corresponds to the shape of the tip of the nozzle.

In order to prevent molten resin from semi- or partially-solidifying in the nozzle due to cooling, a heat retaining ring is provided to heat the tip of the nozzle when the nozzle is separated from the mold. Additionally, when the nozzle is in contact with the mold, the heat retaining ring is separated from the tip of the nozzle. In this embodiment, after injection molding, while the mold is opened and the molded product is removed, the heat retaining ring is automatically mounted on the tip of the nozzle to surround and rapidly heat the tip of the nozzle. Similarly, during injection, immediately before the tip of the nozzle contacts the mold, the heat retaining ring separates and retreats from the tip of the nozzle. Thus, the molten resin material remains in a molten state and never semi-or partially- solidifies in the nozzle. As a result, the resin remains available for the next injection.

Of the above conventional techniques, when molding cycles are repeated by carrying out the plasticizing-measuring process in the nozzle touch state, and the temperature of the mold is set lower than that of the molten resin material, the nozzle can cool causing the resin material to solidify, thereby clogging the nozzle.

Further, when the temperature of the mold is set higher than that of the molten resin material, the temperature of the nozzle can increase due to heat transmitted from the mold. As a result, if the resin material being used is a thermosetting resin, the resin may be heated to such an extent that the resin begins to burn. In addition, if the resin material used is a thermoplastic resin, premature curing can occur before injection, causing the resin material to solidify and clog the nozzle.

In either case, continuous molding is extremely difficult.

In addition, there has been a problem that, if the plasticizing-measuring process is carried out in the nozzle touch state, that is, in the state where the nozzle is closed by resin material injected in the preceding molding cycle that has solidified in the sprue of the mold, until the plasticizing-measuring process is finished, the product molded in the preceding molding cycle cannot be removed. As a result, the duration of the molding cycle cannot be shortened.

In addition, of the aforementioned conventional techniques, in an apparatus wherein the nozzle is closed by being retreated and separated from the mold, as disclosed in JP patent publication No. Sho 49-2976, and the like, a problem occurs in that heat from the nozzle transmits to the nozzle cover decreasing the temperature of the nozzle and causing resin material therein to solidify or harden, thereby clogging the nozzle and making continuous molding impossible.

Further, of the above conventional techniques, in an apparatus wherein nozzle cooling is prevented, a tip of a nozzle is surrounded by a heat retaining ring to heat the nozzle, as disclosed in JP Utility Model laid-open publication HEI 3-64724. In such an apparatus, when the mold and nozzle are separated, the heat retaining ring surrounds and heats the tip of the nozzle. Also, in order to separate and retreat the heat retaining ring from the tip of the nozzle immediately before the tip of the nozzle contacts the mold, a divisional type heat retaining ring is provided, wherein no specific nozzle closing means is provided. As a result, drooling cannot be effectively prevented. Further, in this embodiment, "since the divisional heat retaining ring is needed to be rapidly heated, it is preferable to have 5 times or more heat capacitance compared with the fixed heater installed in the conventional nozzle" (See Hei at page 5, lines 1–4). In addition, this embodiment does not address problems such as deterioration in resin material quality where thermoplastic resins are used, and premature curing in the case where a thermosetting resin is used.

The present invention is directed to solving the above problems, by providing an injection molding machine that can effectively prevent leakage of resin material from a nozzle during a plasticizing-measuring process and can perform continuous molding while maintaining an amount of resin material in a molten state suitable for injection molding, so that molding efficiency can be enhanced.

SUMMARY OF THE INVENTION

The present invention is directed to an injection molding machine comprising a heating cylinder to inject a molten-plasticized resin material from a tip opening of a nozzle into a cavity formed in a mold, a displacing means to displace the heating cylinder to/from the mold and to press the nozzle to the mold, a closing mechanism having a nozzle touch member to close the tip opening of the nozzle and a temperature regulating means to regulate the temperature of the nozzle touch member.

The closing mechanism of the present invention comprises a nozzle touch member displacing means to support the nozzle touch member and displace it to/from the tip opening of the nozzle for closing and opening the nozzle. A displacing means is also provided to support the nozzle touch member displacing means provided on the heating cylinder so that as the nozzle touch member is displaced between a closed position and a retreated position relative to the tip opening of the nozzle.

The closing mechanism of the present invention also includes a positioning means to position the nozzle touch member at the tip opening of the nozzle when closing the tip opening of the nozzle.

In the present invention the plasticizing and measuring process is initiated when the temperature of the nozzle touch member of the closing mechanism is regulated to a temperature suitable for the resin material by the temperature regulating means and the nozzle touch member abuts against the tip opening of the nozzle to close the opening. The resin material supplied to the heating cylinder is melted-plasticized while being kneaded by a rotating screw, or the like, and a given amount of the resin is reserved at the front of the nozzle, when the screw retreats. Then, although the molten-plasticized resin material experiences a back pressure produced as the rotating screw retreats from the heating cylinder, because the tip opening of the nozzle in closed by the nozzle touch member, drooling is substantially prevented. Further, because the temperature regulating means regulates the temperature of the nozzle touch member, the temperature of the nozzle never decreases to such an extent that the resin material solidifies or the quality of the resin material is compromised. In addition, the temperature of the nozzle never increases to such an extent that premature curing of the resin results. Therefore, resin material can be effectively stored in a state that is suitable for injection molding. In other words, the present invention substantially prevents nozzle clogging that can hinder continuous molding by ensuring that resin material in the nozzle does not solidify or harden during the plasticizing-measuring process. When resin material injected and filled in the cavity of a mold is appropriately cooled and solidified, the mold is opened and the molded product is removed. At the same time, the displacing means separates the heating cylinder from the mold and the nozzle touch member closes the tip opening of the nozzle so that the plasticizing-measuring process for the next molding cycle can begin.

In the injection molding machine of the present invention, when the plasticizing-measuring process is initiated, the nozzle touch member displacing means moves the nozzle touch member into the closed position so that the touch member abuts against the tip opening of the nozzle, thereby closing the opening.

In the injection molding machine of the present invention, when the displacing means of the closing mechanism makes the nozzle touch member displacing means displace to the closed position, positioning is carried out by the positioning mechanism so that the nozzle touch member can securely close the tip opening of the nozzle.

DETAILED DESCRIPTION OF PREFERRED EMBODIMENTS

Figure 1:
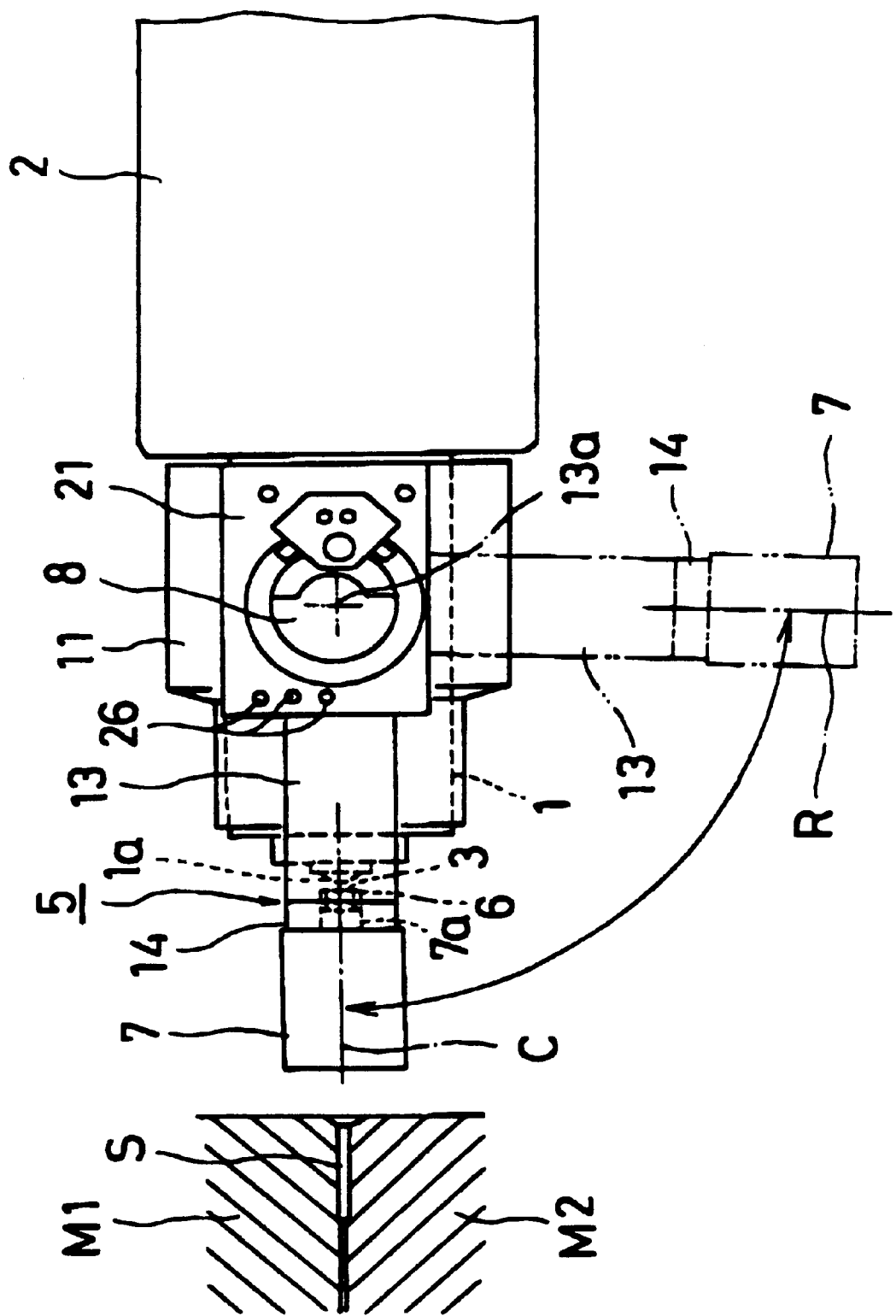
FIG. 1 is a front view of a main portion of an exemplary embodiment of the injection molding machine of the present invention.

The present invention is explained in detail in reference to exemplary embodiments disclosed in FIGS. 1–5. Identical or corresponding parts are labeled with identical reference numbers, and are not separately discussed herein to avoid repetition. An injection molding machine of the present invention comprises several components. First, the present invention comprises a heating cylinder 2 that injects a molten-plasticized resin material from a tip opening of a nozzle 1 into a cavity (not shown) formed between molds M1 and M2. A displacing means (not shown) is also provided to displace the heating cylinder 2 so that the heating cylinder 2 can come close to and separate from the molds M1 and M2 and can make the nozzle 1 press against the molds M1 and M2. In addition, a closing mechanism 5 is provided having a nozzle touch member 3 to close the tip opening 1a of the nozzle 1. Finally, a temperature regulating means 6 is provided to regulate the temperature of the nozzle touch member 3.

The closing mechanism 5 of the injection molding machine of the present invention comprises a nozzle touch member displacing means 7 that supports the nozzle touch member 3 and displaces it to/from the tip opening of the nozzle 1 to close or open it. The displacing means 8, provided in the tip of the heating cylinder 2, rotatably supports the nozzle touch member displacing means 7 so that the nozzle touch member 3 can be displaced between a closed position C and a retreated position R relative to the tip opening 1a of the nozzle 1.

Further, the closing mechanism 5 comprises a positioning mechanism 9 to position the nozzle touch member 3 at the tip opening 1a of the nozzle 1 when the tip opening of the nozzle 1 is to be closed.

Figure 2:
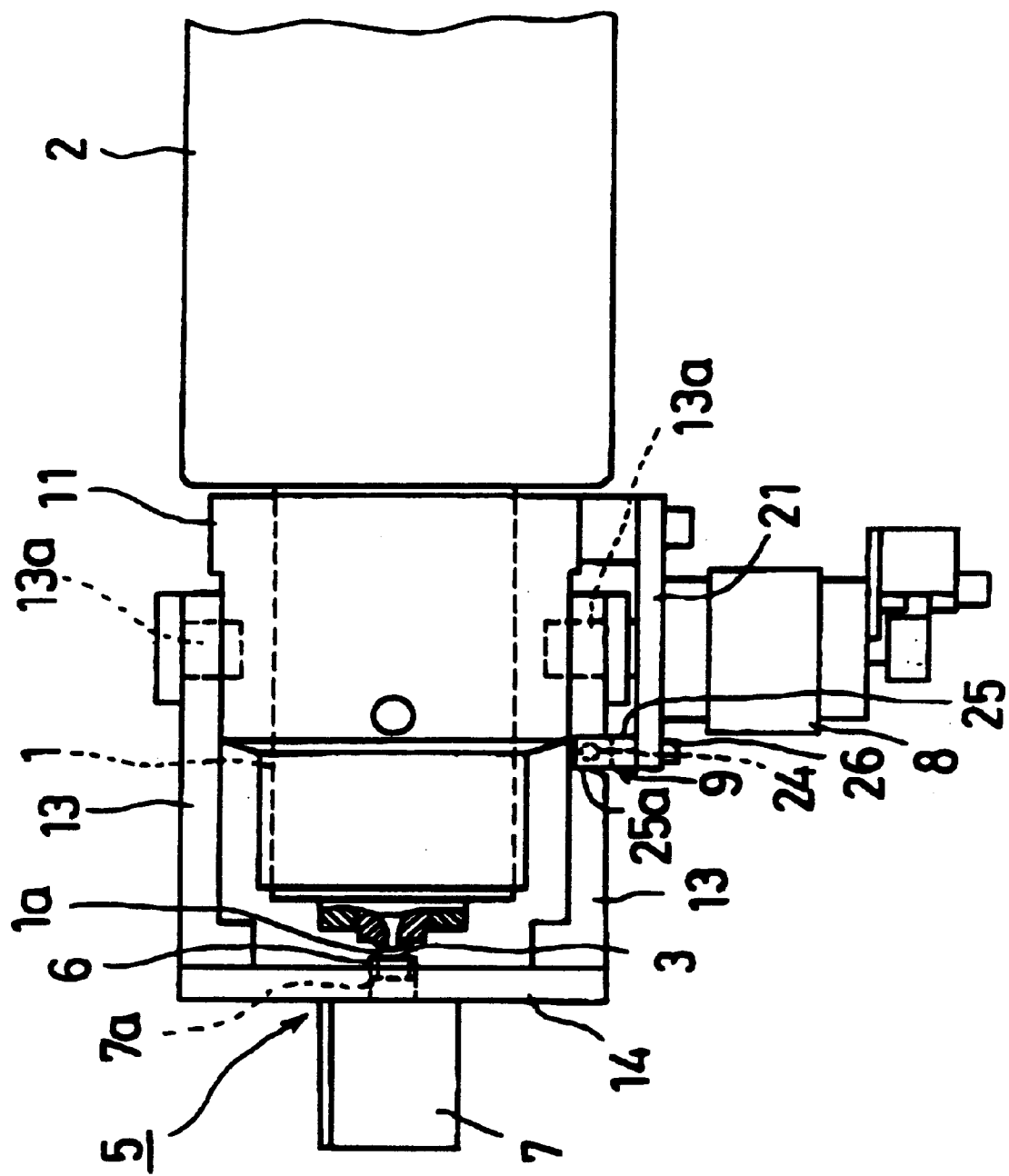
FIG. 2 is a plan view of FIG. 1.
Figure 3:
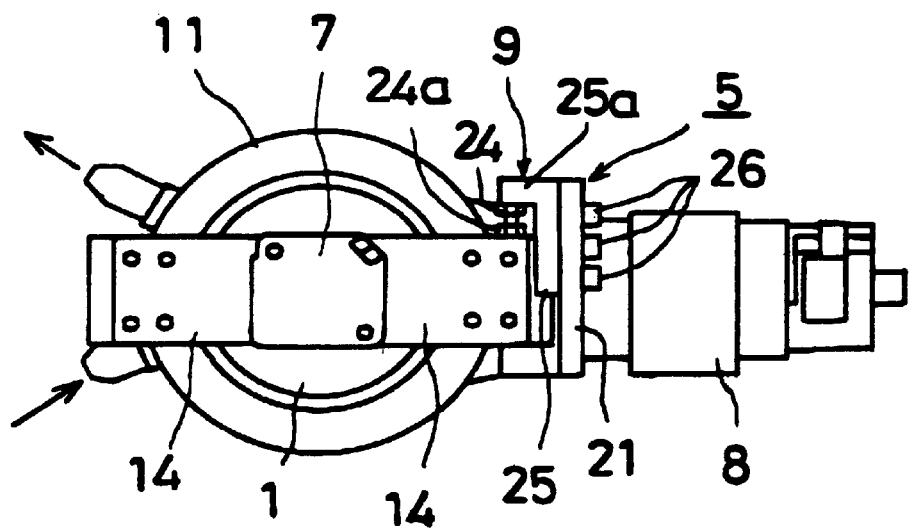
FIG. 3 is a side view of FIG. 1.

FIGS. 1, 2 and 3 are a front view, a plan view and a side view, respectively, showing a main portion of an exemplary embodiment of the injection molding machine of the present invention. As shown in FIG. 1, a mold composed of an upper mold M1 and a lower mold M2 is opened or closed by a vertical type clasping mechanism (not shown). Further, a sprue S, against which the tip of the nozzle 1 abuts and through which plasticized and molten resin material is to be injected, is provided. The sprue S is formed at a parting line that is formed when the upper mold M1 and the lower mold M2 abut against each other. However, the present invention can be applied to other embodiments, including, but not limited to, embodiments wherein a movable mold is displaced substantially-horizontally relative to a fixed mold wherein a sprue S is formed by a lateral type clamping mechanism.

In the heating cylinder 2, a screw (not shown) is rotatably inserted and axially displaced forward and backward to constitute an injection apparatus. At the forward-tip of the heating cylinder 2, the nozzle 1 is mounted. At the tip of the nozzle 1, as shown in FIG. 2, an opening 1a through which the plasticized-molten resin material is injected into a cavity (not shown) formed in the molds M1 and M2 is provided. A displacing means (not shown) displacably supports a heating cylinder 2 so that the heating cylinder 2 can come close to or separate from the molds M1 and M2. The displacing means (not shown) is composed of a shift-cylinder, and the like, to be driven by oil pressure, and the like. In addition, when the heating cylinder 2 comes close to the molds, the nozzle 1 can contact the sprue S at a given pressing force (nozzle touch force).

In the plasticizing-measuring process, by rotating the screw around an axis, the resin material supplied in the heating cylinder 2 is kneaded. At the same time, due to shearing heat generated by the screw, and/or heat generated by a thermal medium channel, heater or the like (not shown) provided on the outer circumference of the heating cylinder 2, the resin material is reserved at the front portion of the heating cylinder 2 while being melted-plasticized. Then, by back pressure generated when the screw axially retreats to a given position, the molten-plasticized resin material is reserved at the front portion of the heating cylinder 2.

In the injection process, the heating cylinder 2 is displaced forward in an axial direction by the shift-cylinder, so that the tip of the nozzle 1 abuts against the sprue S. Then, by advancing the screw axially from its retreated position, molten-plasticized and measured resin material is injected into the cavity formed by molds M1 and M2 from the tip opening 1a of the nozzle 1, provided at the tip of the heating cylinder 2, through the sprue S.

The closing mechanism 5 comprises a jacket cover 11 detachably mounted on the nozzle 1, a pair of arms 13, 13 in which a pivot axis 13a is pivotably mounted on the jacket cover 11 and a mounting member 14 provided to bridge the respective tips of both arms 13,13. In this embodiment, the jacket cover 11 is coupled with the nozzle 1 so that the pivot axis 13a of the arms 13, 13 extends horizontally, and is fixed by a plurality of bolts (not shown). Further, in order to maintain the given temperature of the nozzle 1, the jacket cover 11 has a space therein (not shown) where a thermal medium is provided to circulate so that the resin material therein remains at a temperature suitable for molding (see arrow in FIG. 3).

Figure 4:
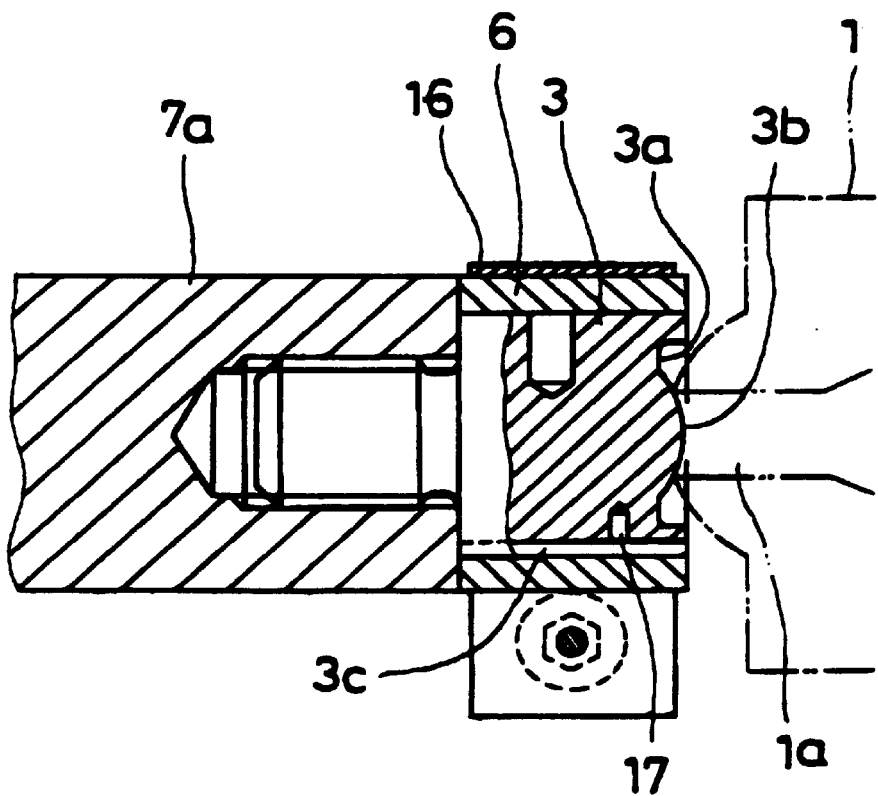
FIG. 4 is as enlarged sectional view of an exemplary embodiment of an electrical heater installed in a nozzle touch member and its surroundings, according to the present invention.

The nozzle touch member displacing means 7, in this embodiment, is a cylinder 7 that makes a piston rod 7a extend/retreat as a function of oil pressure or air pressure, or the like. As shown in FIG. 4, the nozzle touch member 3 is screwed to the tip of the piston rod 7a of the cylinder 7. The cylinder 7 is mounted and supported on the mounting member 14 so that when the nozzle touch member 3 is in the closed position C (explained later), wherein the nozzle touch member 3 is faces the tip opening 1a of the nozzle 1, the nozzle touch member 3 closes the tip opening 1a of the nozzle 1 by extending the piston rod 7a. Further, in order to open the tip opening 1a of the nozzle 1, the piston rod 7a retreats from the opening 1a of the nozzle 1. Thus, in order to open the tip opening 1a of the nozzle 1, the piston rod 7a penetrates the mounting member 14 and its axis becomes parallel with the arm 13.

At the tip surface of the nozzle touch member 3, as shown in FIG. 4, a recessed portion 3a having a concave surface larger in diameter than the tip spherical surface of the nozzle 1 is formed. At the center of the recessed portion 3a, when the piston rod 7a of the cylinder 7 is extended to abut against the tip opening 1a of the nozzle 1, the spherical surface 3b having a given curvature, to which the tip opening 1a of the nozzle 1 can be contacted tightly and closed, is formed.

Figure 5:
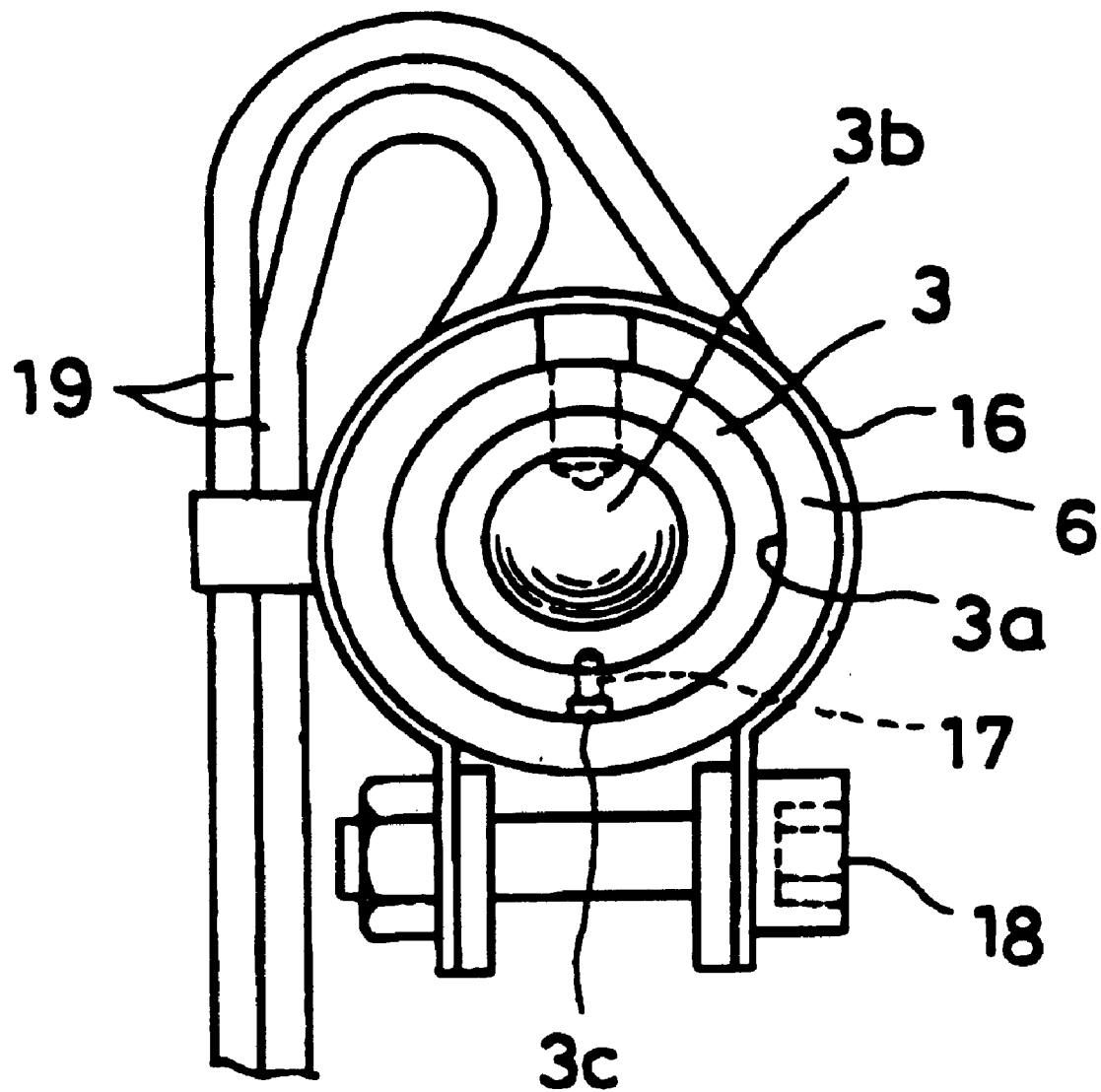
FIG. 5 is a side view of FIG. 4 for showing the side of the electric heater installed in a nozzle touch member and its surroundings.

As shown in FIGS. 4 and 5, around the nozzle touch member 3, an electric heater 6 generates heat by electric current as a temperature regulating means 6 is mounted with the clamping band 16. In the nozzle touch member 3, a temperature detecting means 17, such as a thermocouple, for detecting the temperature is mounted. A groove 3c for accommodating heat-resistant leads for outputting the temperature-detected signal to an outer temperature regulating apparatus (not shown) is also provided. By clamping the bolts and the nuts 18 attached to the clamping band 16, the electric heater 6 is fixed in a state where it is fitted to the outer diameter of the nozzle touch member 3. The electric heater 6 is regulatably connected with the electric power source (not shown) through lead 19. For reference, the temperature regulating means 6 can be replaced with the other means, as long as such other means can keep the temperature of the nozzle touch member 3 at a temperature suitable for the resin material.

As the displacing means 8, in this embodiment, a rotor 8 is provided, having a drive shaft that is driven by air pressure, or the like. The rotor 8 is made so that it mounts on bracket 21 provided on the jacket cover 11 so that the drive shaft cannot mutually rotate on the pivot shafts 13a of the arms 13, upon which the arms 13 rotate. In particular, mutual rotation cannot occur as the arms 13 rotate between the closed position C wherein, as shown in a solid line of FIG. 1, the arms 13 become approximately horizontal, and the retreated position R wherein, as shown in a dotted line of FIG. 1, the cylinder 7 supported by the mounting member 14 of the tip of the arm 13 is positioned downward. For reference, in this embodiment, since the shafts 13a of the arms 13 are mounted on the jacket cover 11 so that the shaft 13a extends horizontally, and since, from the closed position C to the retreated position R, the arms 13 rotate by the force of their own weight, the rotor 8 can rotate the arms 13 from the retreated position R to the closed position C. Further, it is a matter of course that the pivot axis 13a of the arm 13 can be mounted on the jacket cover 11 so that when extending horizontally, a rotor 8 can be used to bi-directionally rotate arms 13 between the closed position C and the retreated position R. Further, in this embodiment, the displacing means 8 comprises the rotor 8 that can driven by air pressure. However, although rotor 8 constitutes a suitable displacing means, other displacing means can be employed as long as such other displacing means can displace the nozzle touch member 3 between the retreated position R and the closed position C.

The positioning means 9 limits the rotation of the arm 13 by the rotor 8 from the retreated position R. In this embodiment, positioning means 9 is composed of a regulating bolt 24 screwed to an upper surface of the longitudinal-intermediate portion of the arm 13 and an abutting member 25. The abutting member 25 includes a projected portion 25a that is formed so that a head of the regulating bolt 24 may abut against it, which is mounted on the bracket 21 by the bolt 26s. The regulating bolt 24 adjusts, when the rotor 8 rotates the arm 13 to the closed position C, so that the spherical surface 3b formed on the tip surface of the nozzle touch member 3 can abut against the projected portion 25a of the abutting member 25 at the position where it faces the tip opening 1a of the nozzle 1, and is fixed by the lock nut 24a. For reference, the positioning mechanism 9 of the present invention can be constituted by screwing the regulating bolt 24 into the projected portion 25a of the abutting member 25 so that when the arm 13 reaches the closed position C, the head of the regulating bolt 24 abuts against the arm 13.

Next, the operation of the injection molding machine of the present invention as described above is explained.

When injection molding is performed, in the above-described embodiment, the upper mold M1 and the lower mold M2 abut on and are clamped together by a vertical type clamping machine (not shown), and the sprue S is formed on the parting line of the molds M1 and M2. The nozzle 1 contacts the sprue S at a given nozzle touch force, so that the heating cylinder 2 is displaced forward by the shift cylinder (not shown). By making the screw in the heating cylinder 2 displace forward, the measured-plasticized resin material reserved at the front of the heating cylinder 2 is injected into the cavity through the nozzle 1 and the sprue S.

At this time, in the closing mechanism 5, the rotor 8 is not rotated. Therefore, the arm is positioned in the retreated position R, due to own weight (see dotted line in FIG. 1). In addition, the piston rod 7a of the cylinder 7 is in the retreated state.

When completing the injection and filling phases and finishing the pressure-keeping process in which the injection pressure is maintained for a given period of time, the heating cylinder 2 is displaced so as to be axially retreated by the shift cylinder and the tip of the nozzle 1 is separated from the sprue S. When the heating cylinder 2 is displaced to be retreated to the extent that the cylinder 7 does not interfere with the molds M1 and M2, the rotor 8 drives the arm 13 to rotate on the pivot shaft 13a. When the arm 13 reaches the closed position C, the regulating bolt 24 screwed to the upper surface of the intermediate portion of the arm 13 abuts against the projected portion 25a of the abutting member 25 mounted on the bracket 21. As a result, the rotation of the arm 13 is limited and the spherical surface 3b formed on the tip surface of the nozzle touch member 3 is positioned so that it opposes the tip opening 1a of the nozzle 1. Then, by driving the piston rod 7a of the cylinder 7 to be extended at a given pressure, the spherical surface 3b formed on the tip surface of the nozzle touch member 3 contacts the tip opening 1a of the nozzle 1 to close the tip opening. Since the nozzle touch member 3 is displaced in parallel with the nozzle 1 in the axial direction and the spherical surface 3b of the tip surface of the nozzle touch member 3 contacts the tip opening 1a of the nozzle 1 from the front thereof, the tip opening 1a of the nozzle 1 is securely closed despite the displaced position of the heating cylinder 2. Further, at that time, the temperature of the nozzle touch member 3 is regulated by the electric heater 6 mounted therearound at a temperature at which the resin material can be injected in the injection process of the following cycle. Thus, no deterioration in resin quality results due to solidification, premature curing or burning of the resin material in the nozzle 1.

As soon as the tip opening 1a of the nozzle 1 is closed, the screw rotates on its axis to initiate the plasticizing-measuring process. In this process, while the resin material supplied in the heating cylinder 2 is kneaded and melted/plasticized at a suitable temperature, the resin material is reserved at the front portion of the heating cylinder 2, and the screw is retreated to a predetermined position due to the back pressure. In other words, the plasticizing-measuring process for the following molding cycle is simultaneously carried out.

Although, back pressure is generated in the measured resin material reserved at the front portion of the heating cylinder 2 due to a resistive force of the retreating displacement of the screw, since the tip opening 1a of the nozzle 1 is closed securely by the nozzle touch member 3 at a given pressure of the cylinder 7, drooling at the nozzle 1 is substantially prevented. Accordingly, after the processes of pressure-keeping and cooling the resin material injected in the cavity of the molds M1 and M2 are finished in the previous molding cycle, it is possible to open the molds and remove the molded product even during the plasticizing-measuring process. That is, according to the present invention, the mold opening process, product removal process and mold closing process can all be carried out simultaneously with the plasticizing-measuring process. Thus, there is no need to wait for the molded product to cool, as in conventional injection molding machines, nor is there a need to wait until just before the following injecting and filling process, to conduct the plasticizing process. As a result, an increase in plasticizing capacity may be realized and molten resin in the optimum state may be injected and filled.

Further, while closing the tip opening 1a of the nozzle 1, since the surroundings of the tip opening 1a are heated and the temperature thereof is regulated by heat transmitted from the electric heater 6 mounted on the nozzle touch member 3 at a given temperature, neither cooling at the tip of the nozzle 1, nor deterioration of resin fluidity or resin quality occurs. In addition, when a thermoplastic is used as the resin material, a problem known as "stringiness" of the resin material, often occurring between the sprue S and the tip opening 1a of the nozzle 1, can be easily solved by cutting any string of resin material by displacement or rotation of the nozzle touch member 3.

When finishing the plasticizing-measuring processes, by retreating the piston rod 7a of the cylinder 7, the nozzle touch member 3 is separated from the tip opening 1a of the nozzle 1 to be opened and the actuation of the rotor 8 is stopped to displace the arm 13 at the retreated position R. For reference, after removing the molded product in the previous molding cycle, by the time the tip opening 1a of the nozzle 1 is opened to rotate the arm 13 to the retreated position R, the upper mold M1 and the lower mold M2 abut and are clamped together by the vertical type clamping mechanism, and the sprue S is formed on the parting line of both molds M1 and M2. As a result, the injection process in the following molding cycle is continuously initiated.

According to the present invention, because of the simple structure including the closing mechanism having the nozzle touch member to close the tip opening of the nozzle and the temperature regulating means to regulate the temperature of the nozzle touch member, the tip opening of the nozzle is securely closed by the nozzle touch member of the closing mechanism in the plasticizing-measuring process. Additionally, drooling of the resin material at the tip opening of the nozzle, resulting from back pressure generated by the retreating screw, can be prevented. Accordingly, the plasticizing-measuring process for the following molding cycle may be carried out simultaneously with the process of mold-opening, molded product-removal or mold-closing for the previous molding cycle. Thus, the duration of each molding cycle can be substantially shortened. In addition, plasticization of a greater amount of resin material can be realized, and larger sized products can be more easily molded. Further, plasticization can be carried out at the most suitable time to rapidly obtain molded products having superior physical properties. In addition, since the temperature of the nozzle touch member is regulated by the temperature regulating means, the fluidity of the resin material at the nozzle portion can be appropriately maintained, and products having excellent quality can be continuously and stably molded. Also, temperature regulation of the nozzle touch member allows the temperature of the resin material to be maintained so that the resin material remains in a suitable state for injection, and continues molding can be achieved. Accordingly, the molding efficiency of the injection molding machine of the present invention can be substantially enhanced.

Also, since the closing mechanism of the present invention comprises a nozzle touch member displacing means supporting a nozzle touch member to be displaced from/to a tip opening to be opened/closed, and a displacing means providing on a heating cylinder for supporting the nozzle touch member displacing means in such a manner as the nozzle touch means is displaced between the closed position and the retreated position of the tip opening of the nozzle, at the time of plasticizing-measuring process, the nozzle touch member can close the tip opening of the nozzle and can substantially prevent drooling.

Additionally, since the closing mechanism of the present invention comprises a positioning mechanism in which the nozzle touch member is positioned to the tip opening of the nozzle at the time of closing the tip opening of the nozzle, the nozzle touch member can be correctly faced to the tip opening of the nozzle, thereby securely closing the tip opening of the nozzle.

What is claimed is:

1. An injection molding machine comprising:
    a heating cylinder to inject a molten-plasticized resin from a tip opening of a nozzle into a cavity formed in a mold;
    a displacing means to displace the heating cylinder to/from the mold and to push the nozzle to the mold;
    a closing mechanism having a nozzle touch member to close the tip opening of the nozzle;
    a rotatable positioning means that rotates the closing mechanism between a closed position and a retracted position so that the nozzle touch member of the closing mechanism is proximate to the tip opening of the nozzle in order to close the tip opening of the nozzle when the closing mechanism is rotated into the closed position;
    a temperature regulating means to regulate a temperature of the nozzle touch member;
    wherein the closing mechanism comprises a nozzle touch member displacing means that supports the nozzle touch member and displaces it to/from the tip opening of the nozzle for closing/opening the tip opening; and
    a displacing means provided on the heating cylinder to support the nozzle touch member displacing means.

* * * * *